July 26, 1949.  E. JACOBSEN  2,477,376
POWER TRANSMITTING MECHANISM FOR
INTERNAL-COMBUSTION ENGINES Filed March 24, 1944  6 Sheets-Sheet 3

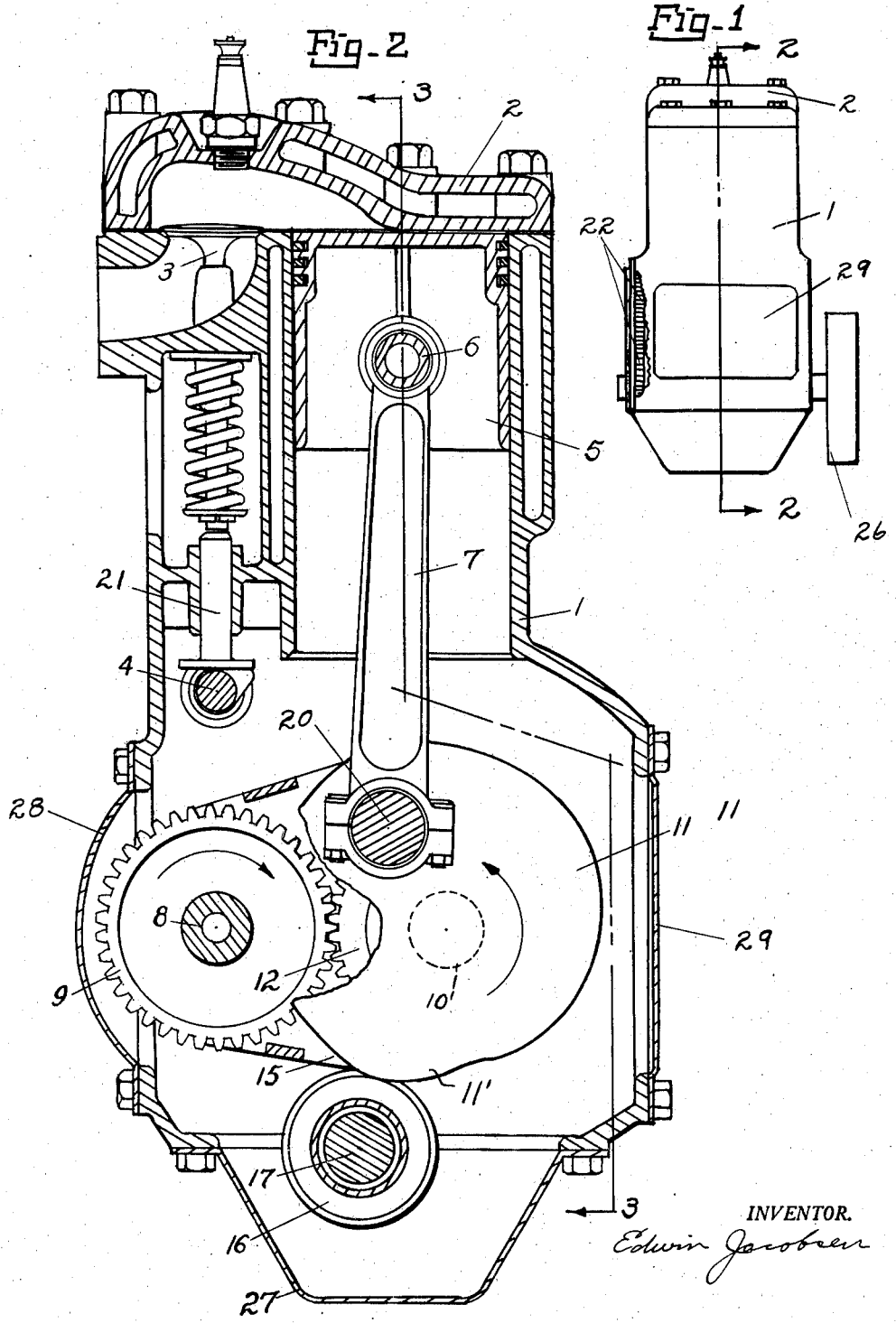

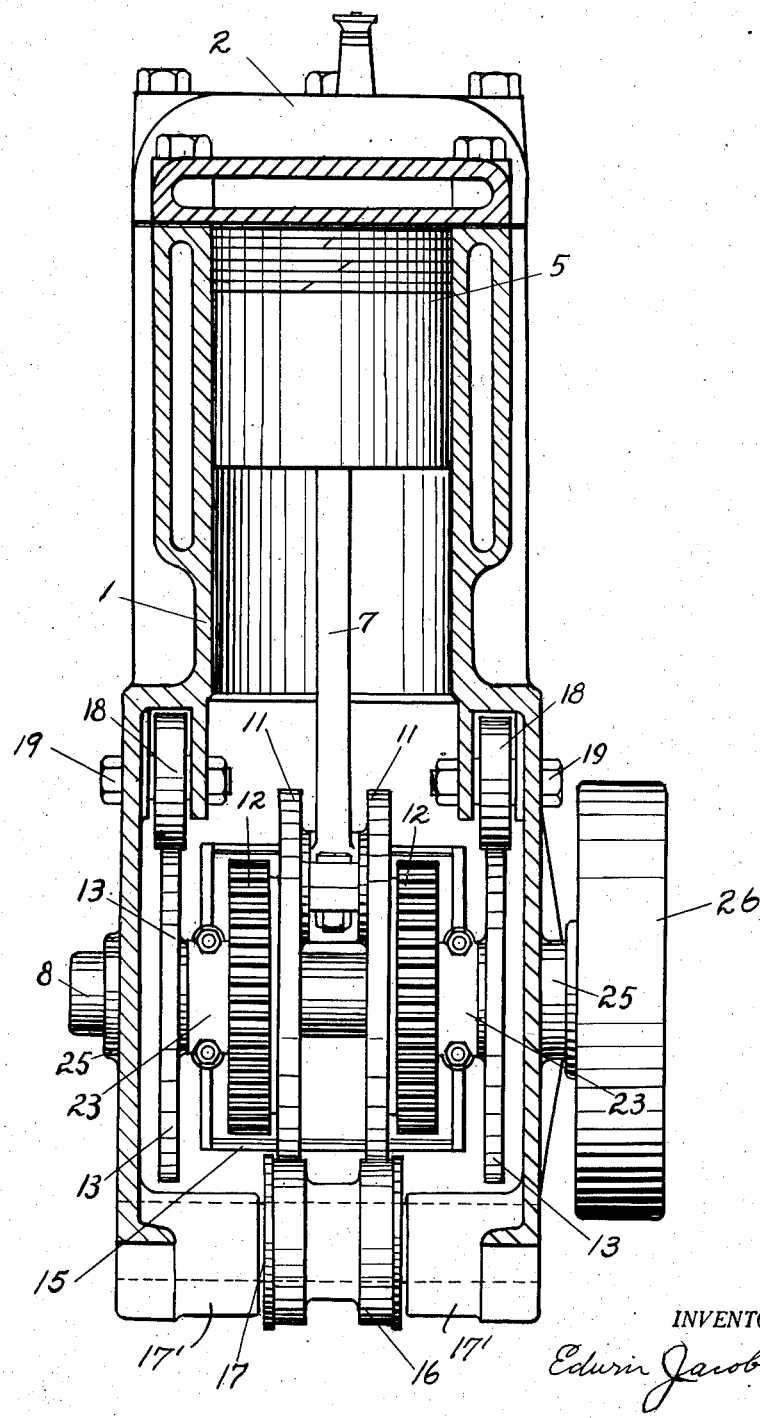

INVENTOR.
Edwin Jacobsen

July 26, 1949.                    E. JACOBSEN                    2,477,376
                       POWER TRANSMITTING MECHANISM FOR
                          INTERNAL-COMBUSTION ENGINES
Filed March 24, 1944                                          6 Sheets-Sheet 5

INVENTOR.
Edwin Jacobsen

July 26, 1949.  E. JACOBSEN  2,477,376
POWER TRANSMITTING MECHANISM FOR
INTERNAL-COMBUSTION ENGINES
Filed March 24, 1944  6 Sheets-Sheet 6
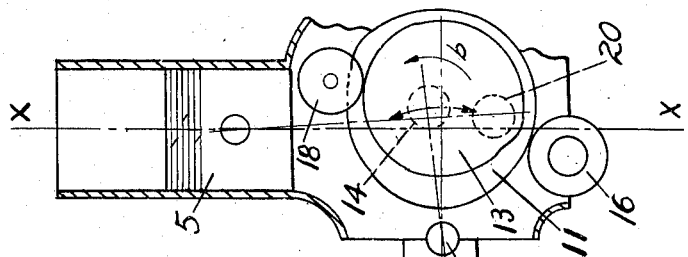
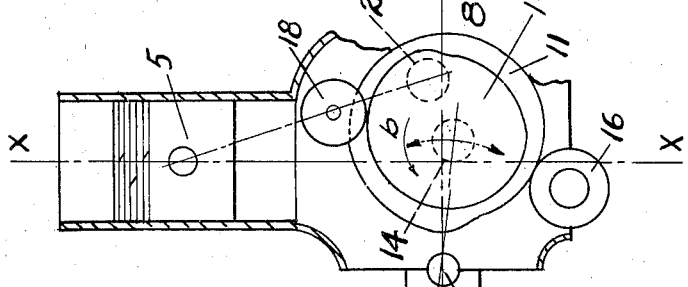
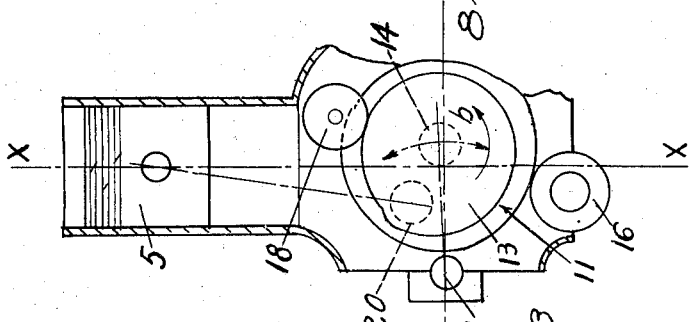
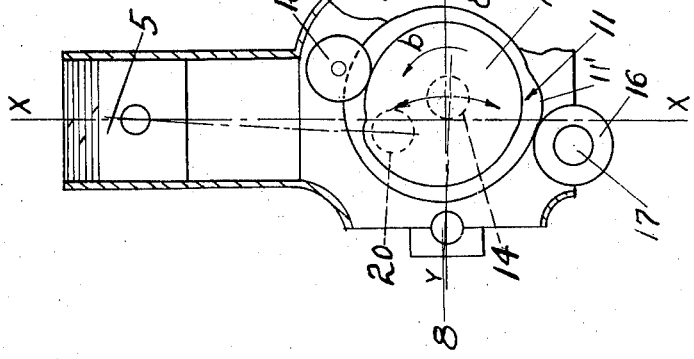
INVENTOR.
Edwin Jacobsen Patented July 26, 1949

2,477,376

UNITED STATES PATENT OFFICE 2,477,376

POWER TRANSMITTING MECHANISM FOR INTERNAL-COMBUSTION ENGINES

Edwin Jacobsen, Altadena, Calif.

Application March 24, 1944, Serial No. 527,977

14 Claims. (Cl. 123—197)

My invention pertains to improvements in internal combustion engines and further relates to an engine of the type shown in my United States Letters Patent No. 2,314,789, issued March 23, 1943.

This invention is capable of accomplishing the results obtained in the above mentioned patent as well as several new results.

For the sake of clarity, my invention is better understood by comparing it with the present day conventional type internal combustion engine.

In the conventional type engine, when the piston is at its top dead center at the beginning of the power stroke, the crank pin is also at its top dead center. This position makes the moment about the crank shaft axis zero, and does not permit the piston force to be transmitted into tangential force in the crankpin circle.

In my present invention, the opposite is true, for the reason that, when the piston is at its top dead center, the crankshaft crankpin is already a predetermined distance past its top dead center. As in the case of the engine shown in the drawings, the crankpin is 30° past its top dead center, while the piston is at the extreme uppermost end of its stroke.

The mechanism in my engine inherently permits a high percentage of the force applied to the piston to be transmitted into tangential force. This results in torque and useful work, a more intelligent application of force.

In the conventional engine the resistance to torque at this point, or top dead center, is infinite, hence momentarily the combustion chamber may be considered as fixed. As the flywheel carries the piston past its top dead center, say 10°, the piston recedes slightly and a small portion of the force on the piston is transmitted into tangential force. In my engine since the crankpin is already 30° past its top dead center and the piston is at its extreme uppermost end of its stroke, the resistance to torque is near its possible minimum.

As the crankshaft moves through its first 10° of travel, the piston recedes many times farther than in the case of the conventional type engine, and at a speed more camparable to the burning rate of the expanding gases. This prevents the critical gas pressures from being exceeded, obviating detonation or "ping."

This mechanism, because of its ability to eliminate a dead center condition in crank mechanisms, lends itself for adoption in various other fields where dead center conditions are prevalent, such as bicycle drive mechanisms, pumps, et cetera.

The primary object of the invention is to provide an internal combustion engine wherein a greater portion of the force applied to the piston when at the beginning of the power stroke is transmitted into tangential force on the crankshaft.

A further object of the invention is to provide an internal combustion engine wherein, the crankshaft crankpin may be at a predetermined number of degrees past the top dead center position, when the piston has reached its uppermost position.

A further object of the invention is to provide an internal combustion engine wherein the first harmonics may be substantially balanced in a single cylinder engine.

A further object of the invention is to provide an internal combustion engine wherein a greater horsepower per pound of fuel may be obtained than is possible in a conventional type engine.

A further object of the invention is to provide an internal combustion engine with a lower specific weight than conventional type engines.

A further object of the invention is to provide an internal combustion engine wherein the torque variations will be in a great degree eliminated.

A further object of the invention is to provide an internal combustion engine wherein the thermal efficiency will exceed the thermal efficiency of external combustion engines in the extremely high horsepower range.

A further object of the invention is to provide a crank mechanism that will obviate dead center conditions.

With these and incidental objects in view, the invention consists in certain novel features of construction and combination of parts, the essential elements of which are set forth in the appended claims and a preferred form of embodiment of which is hereinafter shown with reference to the drawings which accompany and form a part of this specification.

The invention is illustrated by way of example in the accompanying drawings in which:

Figure 1 is a side elevation of a single cylinder engine with parts broken away to show the valve gear train.

Figure 2 is an enlarged cross sectional view taken on line 2—2, Figure 1, looking in the direction indicated and shows the relation of the parts at the firing moment.

Figure 3 is a view in vertical section taken on line 3—3, Figure 2, looking in the direction indicated.

Fig. 11 is a diagrammatical view in section indicating the piston at its upper position, which position corresponds to those indicated in Figs. 9 and 10 at A, A₁ and A₂.

Fig. 12 is a diagrammatical view in vertical section showing the piston position after the crankshaft has rotated thirty degrees from the position shown in Fig. 11, this position corresponding to those indicated in Figs. 9 and 10 at B, B₁ and B₂.

Fig. 13 is a diagrammatical view in vertical section showing the piston when the crankshaft is approximately at its lowermost position, which position corresponds to those indicated in Figs. 9 and 10 at J, J₁ and J₂.

Fig. 14 is a diagrammatical view in vertical section showing the piston at the extreme lower end of its stroke and corresponds to the positions indicated in Figs. 9 and 10 at F, F₁ and F₂.

Like reference characters, refer to like parts throughout the several views.

Figure 4:
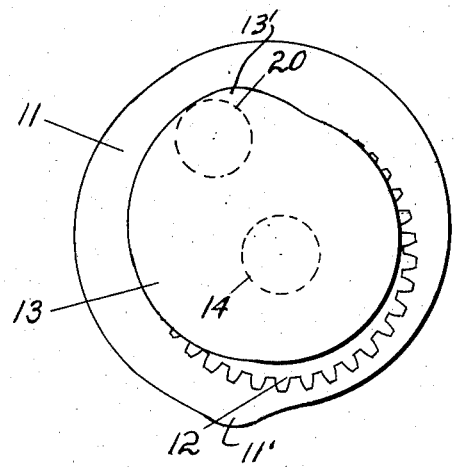
Figure 4 is an end view of the crankshaft removed from the engine showing the follower cam, crank shaft gear and cheek cam and their fixed relative positions.

Referring more particularly to the drawings, it is to be understood that the basic mechanical operation to be performed is to vary the lineal speed of travel of an engine piston with relation to the speed of rotation of an engine crankshaft during a cycle of operation, and to obtain a higher tangential force upon the crankshaft.

In practising the present invention an internal combustion engine is provided as shown in the drawings, having a cylinder block and crankcase unit generally indicated at 1. The cylinder block is of conventional design and is fitted with the usual cylinder head 2. Poppet valves 3 are mounted in the head and are driven by valve gearing comprising a cam shaft 4, tappets 21, and cam shaft drive gears 22. Reciprocably mounted within the cylinder block is a piston 5 carrying a piston pin to which a connecting rod 7 is attached. The connecting rod 7 is attached to a crankshaft 10, which will be hereinafter described.

Figure 5:
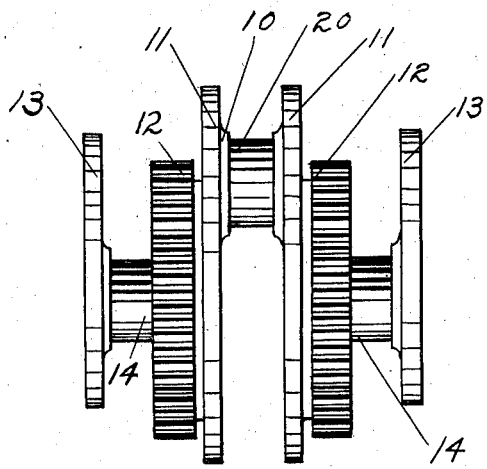
Figure 5 is a side elevation of the crankshaft removed from the engine and shows the relationship to the cams, gears and crank throw.
Figure 6:
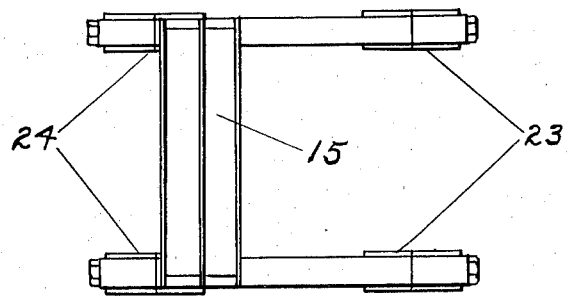
Figure 6 is a plan view of a preferred form of crankshaft cradle.
Figure 7:
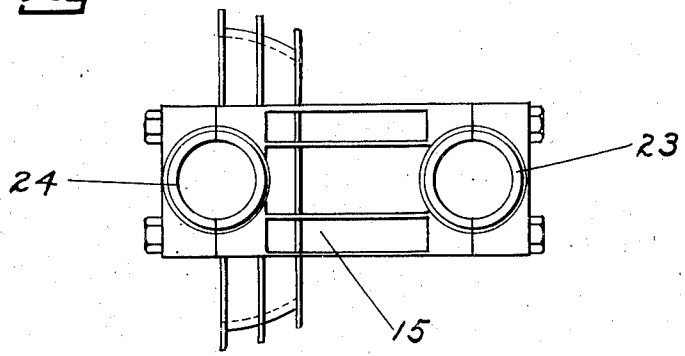
Figure 7 is a side elevation of the cradle shown in Figure 6.

The main bearing structure of the crankcase is offset from the vertical axis of the cylinder block 1 and rotatably supports a fixed axis or power shaft 8 which extends horizontally and is suitably connected to power driving means not shown in the drawings. The shaft is fitted with the conventional flywheel 26. Mounted upon and fixed to rotate with the shaft 8 are power shaft gears 9. These gears are in constant mesh with crankshaft gears 12 which are carried upon the crankshaft 10. The crankshaft, as shown in Fig. 5 of the drawings, is a single throw crankshaft having longitudinally aligned main portions 14 and an offset crank pin 20. At the opposite ends of the crank pin 20 crankshaft cheeks 11 are formed. The cheeks 11 are each formed with a swell 11' on their circumference. The circumference of the cheek cams 11 rides upon the circumference of cheek cam rollers 16, which are carried upon a roller shaft 17 journaled in the bottom of the crankcase in bearings 17'. The weight of the crankshaft 10 rests therefore upon the rollers 16. Formed at the outer faces of the cheek cams 11 and concentric with the main lengths 14 of the crankshaft 10 are the gears 12 which are in constant mesh with the gears 9 carried upon the power shaft 8. The gears 9 and 12 are here shown as having a gear ratio of one to one. Disposed upon the lengths 14 of the crankshaft 10 and spaced from the gears 12 are follower cams 13. These cams are formed with a cam surface along their perimeters which includes a swell 13'. As shown in Fig. 4 of the drawings, the swells 11' on cam 11 and 13' on cam 13 are in substantial vertical alignment when the crank pin 20 is thirty degrees beyond center on its firing stroke. The periphery of cam 13 is intended to be engaged by the circumference of a follower cam roller 18 mounted upon shafts 19. The shafts 19 are carried in suitable bearings in the crankcase of the engine and at a point above the horizontal plane of the power shaft 8.

By reference to Figs. 2 and 11 to 14, inclusive, of the drawings, it will be seen that the cam rollers 16 and 18 cooperate with the cams 11 and 13 to hold the crankshaft 10 in a vertically floating condition. The floating action is provided by a crankshaft cradle 15 which has bearing portions 24, which embrace the power shaft 8 and pivoted thereround, and bearing portions 23, which embrace the main lengths 14 of the crankshaft 10. Thus, the crankshaft cradle 15 may oscillate vertically around the axis of the power shaft 8 and raise and lower the crank 10 bodily as controlled by the configuration of the cams 11 and 13. This raising and lowering action is performed in conjunction with the reciprocation of the piston 5 and thus produces acceleration and deceleration of the lineal speed of travel of the piston as compared with the circumferential speed of travel of the crank pin 20 around the axis of portions 14 of the crankshaft. This structure also makes it possible for the power stroke of the piston to begin at any predetermined degree beyond top dead center of the crank.

Figure 8:
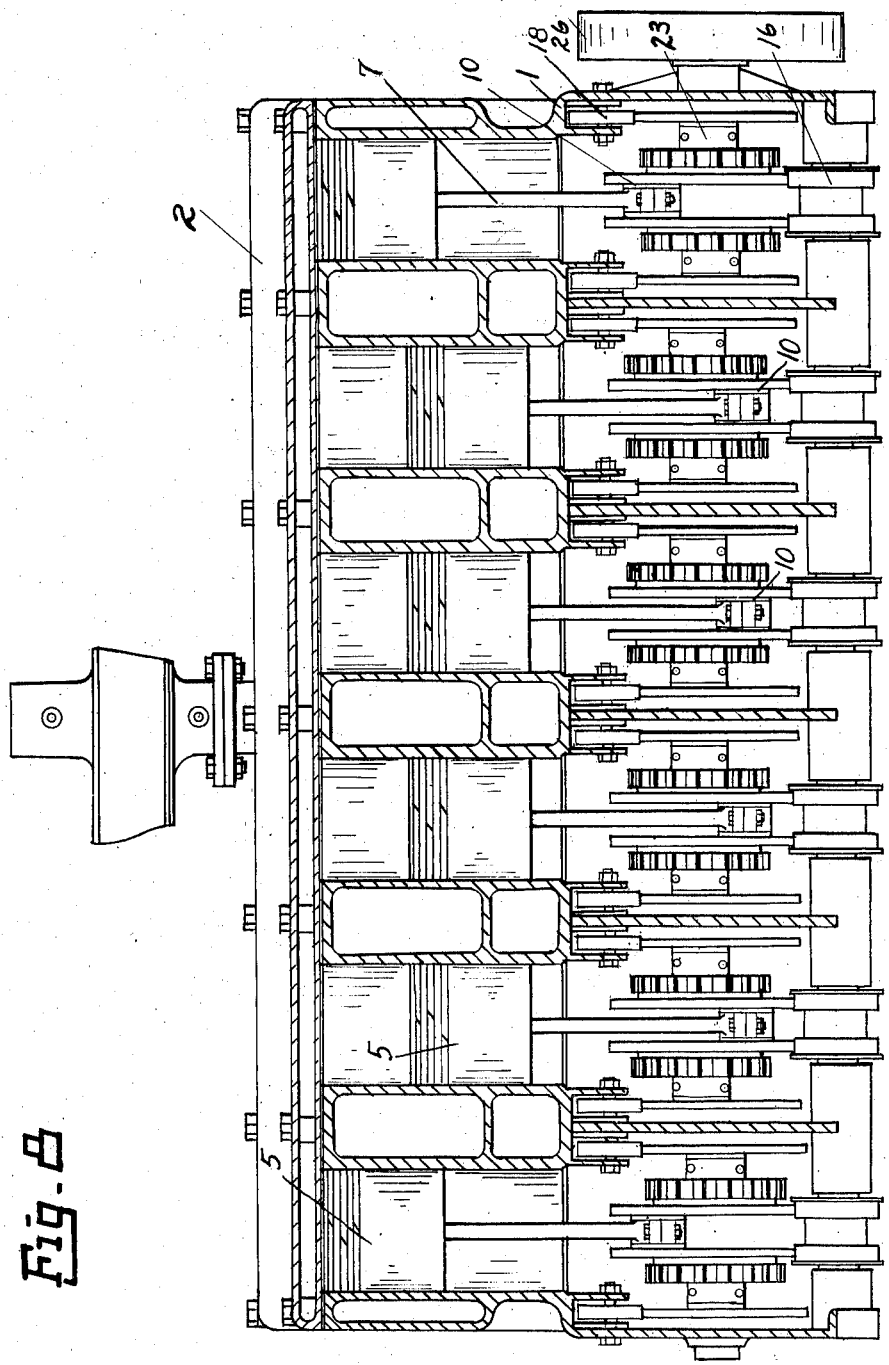
Fig. 8 is a view in central vertical section showing the present invention as applied to a multi-cylinder internal combustion engine.

While the previous description has been concerned with an engine embodying the present invention, and which engine has a single cylinder and a single throw crankshaft, it is to be understood that the same principle may be embodied in a multi-cylinder engine such as illustrated in Fig. 8 of the drawings.

Figure 9:
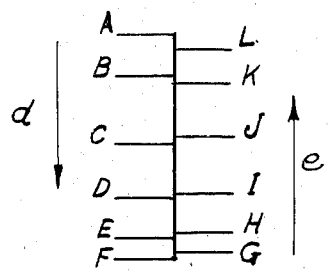
Fig. 9 is a diagrammatical view showing the positions of the engine piston on its up and down strokes and at 30° increments of crankshaft rotation.
Figure 10:
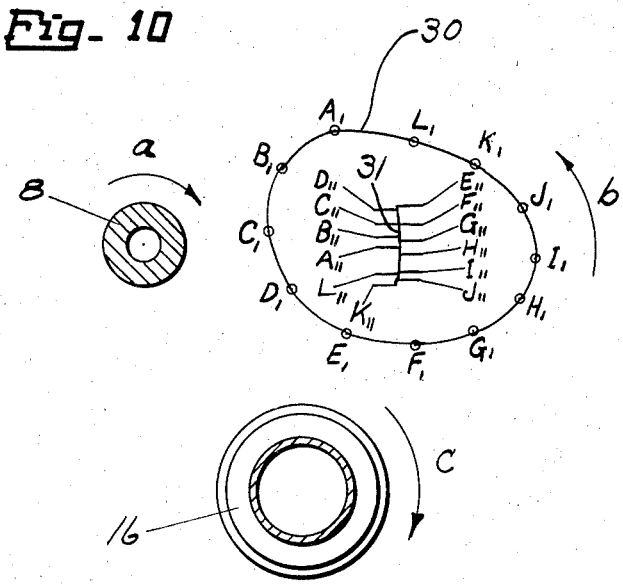
Fig. 10 is a view in diagram showing the positions and paths of travel of the crankshaft and crankshaft pin taken at 30° increments of rotation, and further indicates the relative locations of the cheek cam roller and the power shaft.

Before entering into a description of the operation of the present invention it should be stated that the power shaft 8 rotates in the direction of the arrows $a$, as shown in Figs. 2 and 10 of the drawings, and that the crankshaft 10 rotates in the direction of the arrows $b$, as shown in Figs. 2 and 10 to 14, inclusive. The cam rollers 16 rotate in the direction of the arrow $c$ as shown in Fig. 10. It should also be explained that in the diagrammatical view represented by Fig. 9 the letters A to F represent the piston positions for each thirty-degree increment of rotation of the crankshaft on the down-stroke, as indicated by the arrow d, and that the letters G to L, inclusive, represent the piston positions at thirty-degree increments of rotation of the crankshaft on the up-stroke, as indicated by the arrow e.

In Fig. 10 the orbit of travel of the crank pin 20 is indicated by the line 30 and the points $A_1$ to $L_1$ represent the crank pin positions at thirty-degree increments of rotation of the crankshaft 40 and are directly related to the lettered piston positions A and L, inclusive, shown in Fig. 9.

In Fig. 10 the line 31 represents the path of travel of the axes of the lengths 14 of the crankshaft as the frame 15 oscillates, and the points indicated by the letters $A_2$ to $L_2$, inclusive, represent corresponding position of the axis of the crankshaft when compared with positions simultaneously assumed by the crank pin 14 and the piston 5. Thus, when the piston 5 is in the position indicated at A in Fig. 9 the crank pin 20 will be in the position indicated at $A_1$ in Fig. 10 and the main axis of the crankshaft will be in the position indicated at $A_2$ in Fig. 10.

By reference to Figs. 11 to 14, inclusive, of the drawings, it will be seen that the vertical axes of the engine cylinder is indicated by the center line X—X, and that the horizontal plane of the axis of the power shaft 8 is indicated at Y—Y. Thus, when the piston 5 is in its upper position, as shown in Fig. 11, the crank pin 20 will be in the position indicated in Fig. 10 at $A_1$, and the main axis of the crankshaft will approximately coincide with the plane Y—Y and will be in the position indicated at $A_2$ in Fig. 10.

By reference to Fig. 12 of the drawings the piston 5 is shown as having moved down within the cylinder so that the crank pin 20 has moved an increment of thirty degrees from the position shown in Fig. 11. This corresponds with the piston position B in Fig. 9, at which time the crank pin 20 will be at the position indicated at $B_1$ in Fig. 10 and the main axis of the crankshaft will have raised to the position indicated at $B_2$ in Fig. 10, it being understood that this action has been produced by the configuration of the cheek cams 11 and 13 as they have moved between the rollers 16 and the rollers 18. In Fig. 12 it will be noted that the main axis of the crankshaft will be above the plane of the line Y—Y.

Referring to Fig. 13 of the drawing it will be seen that the main axis of the crankshaft is below the plane Y—Y at or near its lower point of travel. That point is indicated in Fig. 10 at $J_2$, at which time the crank pin 20 will be traveling upwardly, as indicated at $J_1$, and the piston 5 will be in the position indicated at J in Fig. 9.

In Fig. 14 the piston 5 is shown in its lowermost position. This is represented in Fig. 9 at F. At this time it will be noted that the main axis of the crank shaft has nearly reached its uppermost position above the plane Y—Y, as indicated at $F_2$ in Fig. 10, and that the crank pin 20 will be substantially at its lowermost position as indicated by the point $F_1$ in Fig. 10.

The operation of the engine begins with the piston 5 at its extreme uppermost position as shown in Figures 2 and 3, as the piston moves downward on its power stroke it rotates the cheek cams 11 which in turn causes the crankshaft axis to move upwardly in a direction opposite to the piston movement. At the end of the power stroke, as the piston moves upwardly on the exhaust stroke, the crankshaft axis is moved downwardly until the crankpin 20 is at its upper dead center at which time the cheek cams 11 cause the crankshaft axis to rise so as to keep the piston 5 on an upward path until the crankpin is 30 degrees, or a predetermined point beyond its top dead center position.

It may be seen from the above description, that as the piston moves downwardly, the crankshaft axis and the movable portion of the epicyclic train moves upwardly and vice versa.

By careful design the inertia forces of the reciprocating parts may be dynamically balanced in the first harmonics by the inertia forces of the epicyclic train. By carrying this further, the second harmonics may be partially balanced by counter weights on the crankshaft 10, this centrifugal force may be added to the inertia forces of the epicyclic gear train in balancing the engine in the first harmonics. That is to say, it is possible to balance a single cylinder engine substantially 100% in both the first and second harmonics.

The fixed axis shaft 8 also gives great latitude in supplementing balance. It is commonly known in the mechanical arts that a comparable balance is not possible in the conventional type single cylinder engine, which reason, compels a compromise of approximately 50% of the reciprocating weight which results in a compromise between the first and second harmonics. However, in addition to its own inherent advantages, my engine incorporates all the possibilities of balance adaptable to the conventional type engine. In a conventional type engine it is necessary to have a multi-cylinder engine in order to simulate balance dynamically.

The conventional practice produces torsional vibration which calls for added crankshaft weight, larger bearings, et cetera.

In my engine, each cylinder is individually balanced and has independent crankshafts 10 which are geared to the straight fixed axis shaft 8. Since the crankpin 20 is past its dead center when the piston 5 begins its power stroke, and the reaction to the force is taken through the cam cheeks 11 of the crankshaft 10 the bending moment on the crankshaft 10 is very low, minimizing other stresses to the point that the crankshaft may be made very light. Torsional vibration is eliminated so far as the crankshafts are concerned. This permits lighter engine structure of crankcase crankshafts, bearings, et cetera.

It may be seen that the inertia forces caused by the movement of the epicyclic trains may be varied without varying the basic timing and lifts of these cams. This may be accomplished by varying the acceleration, that is to say, when the crankpin is at its top dead center, the cam lift necessary to keep the piston on its upward path, until the crankpin is 30 degrees past its top dead center may be considered as the first half of travel of a harmonic cam, having arrived at its maximum acceleration when in the position shown in Figure 2. The second half of the travel of the harmonic cam may be considered from the position shown in Figure 2, until the crankpin reaches its lower dead center position. These same increment movements may be carried out by two complete harmonic cam cycles, thereby permitting the minimum, the maximum, and the intermediate inertia forces, to be used to advantage in balancing the inertia forces of the reciprocating parts.

The foregoing is mentioned to show only one of the many inherent advantages existing along these lines and in no way intends to limit or confine the various combinations or possibilities that are obviously apparent to those trained in the mechanical arts.

My engine also permits placing the center line of the cylinder, offset to the perpendicular centerline of the crankshaft in the direction of rotation as shown in Figure 2. This offset is not limited but may be placed so as to balance and minimize torque reactions.

The crankshaft 10, is journaled in the bearings 23 of the cradle 15 and journaled on the fixed axis shaft 8 which in turn is rotatably disposed in the fixed axis bearings 25. A conventional flywheel 26 is provided and secured to the fixed axis shaft 9. The oil case 27 is removably secured to the crank case in the common manner. I also provide the cover plates 28 and 29 for assembly and inspection purposes.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In an internal combustion engine having a piston, a single throw crankshaft, a connecting rod therebetween, the crankshaft being rotatably disposed on an axis which itself oscillates on a fixed axis shaft and geared thereto, means for moving the crankshaft axis in the direction of the piston motion near the end of the compression stroke and beginning of the power stroke and means for imparting motion opposite the piston motion through the remainder of the power stroke while the crankshaft is rotating.

2. In an internal combustion engine having a piston, a crankshaft, a connecting rod therebetween, a fixed axis shaft disposed in the crank case, a cradle for holding the fixed axis shaft and crankshaft in spaced relationship, gears on said crankshaft and fixed axis shaft forming an epicyclic train, means for dynamically balancing the reciprocating inertia forces of the engine by the inertia forces of the epicyclic train caused by moving the axis of the crankshaft in a direction opposite to the direction of the piston movement.

3. In and internal combustion engine having a piston, a crankshaft rotatably disposed in a movable axis, a fixed axis shaft separately journaled in the crank case, a cradle for holding said shafts in spaced relationship, geared means for imparting the rotary motion of the crankshaft to the fixed axis shaft, a pair of cams for imparting predetermined motion to the crankshaft axis, a pair of follower cams for making the first mentioned motion positive and means for equalizing the torque reaction of the engine, consisting of placing the center line of the cylinder offset to the center line of the crankshaft in the direction of rotation.

4. In an internal combustion engine having a fixed axis shaft journaled in its crank case, a crankshaft, a cam mounted on the fixed axis shaft, a cradle for holding said shafts in spaced relationship, a fixed roller for the cams to operate on, said cams constituting means for varying the torque of the engine during the latter portion of the compression cycle.

5. In an internal combustion engine having at least one fixed axis shaft, a multiplicity of single throw crankshafts rotatably disposed in axes, that themselves move through predetermined angles about said fixed axes shafts, mechanical means consisting of cams and rollers for imparting predetermined motion to the crankshafts axes and means for transmitting the rotary motion of the crankshafts to the fixed axis shafts.

6. In an engine having at least one single throw crankshaft journaled in a cradle, said cradle being hinged to a separately fixed axis shaft, mechanical means for transmitting the rotary motion of the crankshaft to the fixed axis shaft and means for moving the axis of the crankshaft during its rotation so that the crankpin is a predetermined distance past its top dead center when the piston is at its top dead center.

7. In an internal combustion engine, a cylinder, a crankcase therebeneath, a fixed driven shaft journaled in said crankcase, an oscillating cradle pivoted upon the axis of the fixed driven shaft, a crankshaft rotatably supported on the free end of said cradle, a piston reciprocably mounted within the cylinder, a connecting rod between the crankshaft and the piston, means cooperating between the crankshaft and the crankcase whereby rotation of the crankshaft will produce predetermined oscillation of the cradle, and driving means between the crankshaft and the driven shaft.

8. In an internal combustion engine, a cylinder, a crankcase therebeneath, a fixed driven shaft journaled in said crankcase, an oscillating cradle pivoted upon the axis of the fixed driven shaft, a crankshaft rotatably supported on the free end of said cradle, a piston reciprocably mounted within the cylinder, a connecting rod between the crankshaft and the piston, means cooperating between the crankshaft and the crankcase whereby rotation of the crankshaft will produce predetermined oscillation of the cradle and controls the degree of crank pin travel beyond top dead center at which the power stroke begins, and driving means between the crankshaft and the driven shaft.

9. In an internal combustion engine having a crankshaft rotatably disposed on an axis that itself shifts bodily relative to the crank case, means for shifting said axis in the direction of the piston motion near the end of the compression stroke of the piston and near the beginning of the power stroke, and means for imparting shifting movement to said crankshaft axis with relation to the piston motion through the remainder of the power stroke of the piston.

10. In an internal combustion engine having a piston, a crankshaft mounted to oscillate around an eccentric axis, a connecting rod therebetween, a crank case, a fixed axis power shaft rotatably disposed within the crank case, and gears on said crankshaft and power shaft forming an epicyclic train between the fixed axis power shaft and the crankshaft.

11. In an engine having a fixed axis power shaft rotatably disposed in its crank case, a crankshaft having integral cheek cams fixed to the crankshaft, an epicyclic gear train between said fixed axis shaft and the crankshaft, a cradle pivotally mounted on said power shaft and rotatably supporting the crankshaft at its free end for holding said shafts in spaced relationship, a roller engaging said cheek cams, and means for causing said cams to follow the roller.

12. In an engine having a fixed axis power shaft rotatably disposed in a crank case, a crankshaft having integral cheek cams fixed thereto, an epicyclic gear train between said fixed axis shaft and the crankshaft, a roller engaging said cheek cams, follower cam rollers, a pair of follower cams secured to the crankshaft and cooperating with the follower cam rollers to maintain the cheek cams in contact with their rollers.

13. In an engine having a piston, a single throw crankshaft, a connecting rod therebetween, said crankshaft being rotatably disposed on an axis which itself oscillates about a fixed axis power shaft, and gears on said fixed axis power shaft and crankshaft forming an epicyclic train.

14. In an internal combustion engine having a piston, a crankshaft, a connecting rod therebetween, said crankshaft being rotatably disposed on an axis which itself oscillates with relation to a fixed axis driven shaft, and gears forming an epicyclic train for continuously imparting motion from the fixed axis driven shaft by the rotation of the crankshaft.

EDWIN JACOBSEN.

REFERENCES CITED

The following references are of record in the file of this patent:

UNITED STATES PATENTS

| Number | Name | Date |
| --- | --- | --- |
| 634,194 | Woodword | Oct. 3, 1899 |
| 887,633 | Heginbottom | May 12, 1908 |
| 939,669 | Cole | Nov. 9, 1909 |
| 1,715,368 | Jaussaud | June 4, 1929 |
| 2,166,975 | Sologaistoa | July 25, 1939 |